(12) United States Patent
Smith et al.

(10) Patent No.: US 11,163,716 B2
(45) Date of Patent: Nov. 2, 2021

(54) DISCOVERY CONTROLLER REGISTRATION OF NON-VOLATILE MEMORY EXPRESS (NVME) ELEMENTS IN AN NVME-OVER-FABRICS (NVME-OF) SYSTEM

(71) Applicant: DELL PRODUCTS L.P., Round Rock, TX (US)

(72) Inventors: Erik Smith, Douglas, MA (US); Joseph LaSalle White, San Jose, CA (US); David Black, Acton, MA (US); Raja Subbiah, Chennai (IN)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 16/820,547

(22) Filed: Mar. 16, 2020

(65) Prior Publication Data

US 2021/0286745 A1    Sep. 16, 2021

(51) Int. Cl.
*G06F 13/40* (2006.01)
*G06F 13/16* (2006.01)

(52) U.S. Cl.
CPC ........ *G06F 13/404* (2013.01); *G06F 13/1668* (2013.01)

(58) Field of Classification Search
CPC .................. G06F 13/404; G06F 13/1668
See application file for complete search history.

(56) References Cited

U.S. PATENT DOCUMENTS

| | | | |
|---|---|---|---|
| 2018/0074717 A1* | 3/2018 | Olarig | G06F 11/0757 |
| 2018/0270119 A1* | 9/2018 | Ballapuram | H04L 67/1097 |
| 2019/0245924 A1 | 8/2019 | Li | |
| 2020/0065269 A1* | 2/2020 | Balasubramani | G06F 15/17331 |

(Continued)

OTHER PUBLICATIONS

"FC and FCoE versus iSCSI—"Network-centric" versus "End-Node-centric" provisioning," [online], [Retrieved Oct. 12, 2020]. Retrieved from Internet <URL:https://brasstacksblog.typepad.com/brass-tacks/2012/02/fc-and-fcoe-versus-iscsi-network-centric-versus-end-node-centric-provisioning.html> (6pgs).

(Continued)

*Primary Examiner* — Glenn A. Auve
(74) *Attorney, Agent, or Firm* — North Weber & Baugh LLP

(57) ABSTRACT

Presented herein are embodiments for registering elements of a non-volatile memory express (NVMe) entity in an NVMe-over-Fabric (NVMe-oF) environment. In embodiments, a method for registering with a centralized storage fabric service component via a discovery controller (DC) of the centralize service comprises transmitting a DC registration command to the DC. In embodiments, the DC registration command includes a number of registration entries that the NVMe entity will be submitting for registration. In embodiments, the identified number of NVMe registration entries are transmitted to the centralized service and are stored in a registry. The NVMe registration entry may include an entry type for indicating an NVMe registration entry type, an NVMe qualified name (NQN) for identifying (Continued)

the NVMe entity, and a transport address for specifying an address of the element of the NVMe entity. Other NVMe entities may query the registry to obtain information about NVMe elements in the system.

20 Claims, 11 Drawing Sheets

(56) References Cited

U.S. PATENT DOCUMENTS

| | | | |
|---|---|---|---|
| 2020/0081640 A1* | 3/2020 | Enz | G06F 3/0632 |
| 2020/0310657 A1 | 10/2020 | Cayton | |
| 2020/0319812 A1 | 10/2020 | He | |
| 2020/0349094 A1 | 11/2020 | Smith | |
| 2020/0409893 A1 | 12/2020 | Puttagunta | |
| 2021/0019272 A1 | 1/2021 | Olarig | |
| 2021/0028987 A1 | 1/2021 | Krivenok | |
| 2021/0064281 A1 | 3/2021 | Satapathy | |
| 2021/0124695 A1 | 4/2021 | Jaiswal | |

OTHER PUBLICATIONS

"NVMe over Fabrics' Discovery problem," [online], [Retrieved Oct. 12, 2020] Retrieved from Internet <URL:https://brasstacksblog.typepad.com/brass-tacks/2017/12/nvme-over-fabrics-discovery-problem.html> (2pgs).

"Hard zoning versus soft zoning in a FC/FCoE SAN," [online], [Retrieved Oct. 12, 2020] Retrieved from Internet <URL:https://brasstacksblog.typepad.com/brass-tacks/2012/01/hard-zoning-versus-soft-zoning-in-a-fcfcoe-san.html> (5pgs).

"NVM Express Over Fabrics," revision 1.0, May 31, 2016, [online], [Retrieved Oct. 12, 2020] Retrieved from Internet <URL:http://nvmexpress.org> (49pgs).

"NVM Express Over Fabrics," revision 1.1, Oct. 22, 2019, [online], [Retrieved Oct. 12, 2020] Retrieved from Internet <URL:http://nvmexpress.org> (83pgs).

"NVM Express Base Specification," revision 1.4, Jun. 10, 2019, [online], [Retrieved Oct. 12, 2020] Retrieved from Internet <URL:http://nvmexpress.org> (403pgs).

Non-Final Office Action dated Jun. 11, 2021, in U.S. Appl. No. 16/898,216. (10 pgs).

Non-Final Office Action dated Jun. 11, 2021, in U.S. Appl. No. 16/898,191. (7 pgs).

Non-Final Office Action dated Jul. 23, 2021, in U.S. Appl. No. 16/925,131. (11 pgs).

* cited by examiner

_500_

| | OpCode=E1h | FUSE, Reserved, PSDT | CID | 3 |
|---|---|---|---|---|
| 0 | | | | |
| 4 | NSID = 0h | | | 7 |
| 8 | Reserved | | | 15 |
| 16 | MPTR - Not used, Reserved | | | 23 |
| 24 | | | | |
| | DPTR - SGL1 | | | 39 |
| 40 | CDW10 ⌒ 505 | | | 43 |
| 44 | 510 ⌒ CDW11 | | | 47 |
| 48 | CDW12 - Reserved | | | 51 |
| 52 | CDW13 - Reserved | | | 55 |
| 56 | CDW14 - Reserved | | | 59 |
| 60 | CDW15 - Reserved | | | 63 |

FIG. 5

DISCOVERY CONTROLLER REGISTRATION OF NON-VOLATILE MEMORY EXPRESS (NVME) ELEMENTS IN AN NVME-OVER-FABRICS (NVME-OF) SYSTEM

BACKGROUND

The present disclosure relates generally to an information handling system. More particularly, the present disclosure relates to systems and methods for registering elements of NVMe hosts or NVM subsystems with a centralized discovery controller in an NVMe-oF environment.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Enterprise customers are under tremendous pressure to reduce the expense for data storage. To this end, as the customers review their infrastructures and look for opportunities to eliminate costs, some have come to view the Fibre Channel Storage Area Network (FC SAN) as an unnecessary expense. That is, at least until they realize that any savings they would achieve through a capital expenditure reduction (e.g., by moving off of FC and onto NVMe-oF (TCP)) may be more than paid back in operational expense due to the end-node centric nature of Ethernet-based transports.

In addition, until recently, the performance attributes of storage traffic over Ethernet were significantly worse than FC's. For example, CPU utilization and latency were typically much higher; input-output-per-second (IOPs)/bandwidth were typically significantly lower. However, upon introduction of a new upper layer protocol (ULP) "NVMe" and its use of RoCE (Remote Direct Memory Access (RDMA) over Converged Ethernet), all of this has changed and NVMe over 25G RoCE has equivalent CPU utilization, input-output operations per second (IOPS) and latency as SCSI-FCP over 32 Gigabits Fiber Channel (GFC).

FC is considered by some to be the most popular transport protocols because: (1) it provides a relatively complete set of supported devices and data services; and (2) the customers of FC have spent the past twenty years developing business processes and deployment best practices around FC and its network-centric approach to provisioning.

A basic problem of an Ethernet transport for NVMe-oF, such as transmission-control protocol (TCP) or remote-direct-memory-access (RDMA) over converged-Ethernet (RoCE), is that the underlying Ethernet transport is an end-node centric storage protocol (i.e., every NVMe host must be explicitly configured to access storage at one or more IP addresses). This configuration process is tedious and error prone as well as needing manual intervention in the case of a temporary loss of connectivity (e.g., storage-side cable pull). The current management process of an NVMe-oF-over-Ethernet transport also requires configuration of the multipathing software.

Accordingly, it is desirable to provide solutions that resolve the end-node device configuration problems of NVMe-oF-over-Ethernet transports.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may be not to scale.

FIG. 5 depicts a discovery controller registration command, according to embodiments of the present disclosure.

DETAILED DESCRIPTION OF THE PREFERRED EMBODIMENTS

Figure 1:
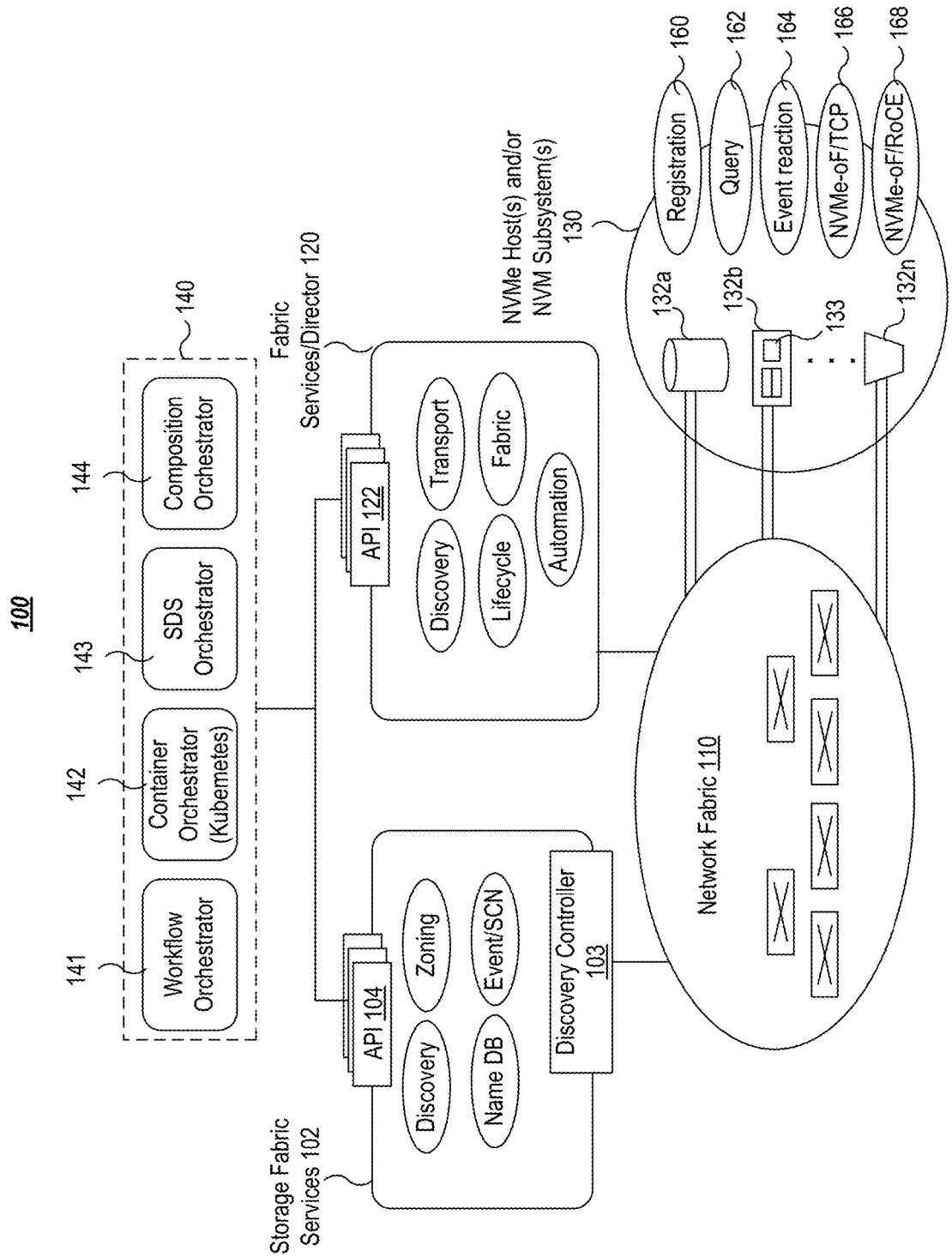
FIG. 1 depicts an NVMe-oF ecosystem, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms and any lists that follow are examples and not meant to be limited to the listed items.

A service, function, or resource is not limited to a single service, function, or resource; usage of these terms may refer to a grouping of related services, functions, or resources, which may be distributed or aggregated. The use of memory, database, information base, data store, tables, hardware, and the like may be used herein to refer to system component or components into which information may be entered or otherwise recorded. The terms "data," "information," along with similar terms may be replaced by other terminologies referring to a group of bits and may be used interchangeably.

It shall be noted that: (1) certain steps may optionally be performed; (2) steps may not be limited to the specific order set forth herein; (3) certain steps may be performed in different orders; and (4) certain steps may be done concurrently.

FIG. 1 depicts an NVMe-over-Fabrics (NVMe-oF) system 100, according to embodiments of the present disclosure. As depicted, the system 100 may include: a Storage Fabric Service (StFS) 102, which includes (among other features or services) a discovery controller 103 (which may also be referred to as an NVMe discovery controller, a centralized discovery controller, or a root discovery controller) that provides access to the discovery services for NVMe hosts (e.g., 132b) and NVM storage subsystems (e.g., 132a and 132n); a network fabric 110 that may include one or more switches and routers; a fabric service/director 120 (such as, SmartFabric Service/Director by Dell of Round Rock, Tex.—although embodiments herein reference Smart-Fabric Service/Director, it shall be noted that other fabric services/directors may be used); and one or more orchestrators 140.

In one or more embodiments, the NVMe entities 130 may include one or more hosts (e.g., host 132b), one or more storage elements (e.g., storage items 132a and 132n), or both. As depicted in FIG. 1, these devices are communicatively coupled to the network fabric 110. A host may be an NVMe server or any other suitable type of computing device that is capable of accessing data stored in a storage element (e.g., one or more of the storage elements 132a and 132n) via the network fabric 110. A storage element (e.g., storage element 132a and/or 132n) may be an NVM subsystem (the terms storage element and NVM subsystem may be used interchangeably herein), which may be implemented as a storage array, multiple NVMe-oF drives, storage volume, namespace, logical unit number (LUN), extent, disk, or the like. It is noted that the system 100 may include any number of NVMe hosts and/or NVM subsystems 130.

In one or more embodiments, the StFS 102 may reside on a computing device or devices of the network fabric 110, including on one or more virtual machines operating within or attached to the network fabric 110; however, it shall be noted that the StFS 102 may reside within any other suitable components in the system 100. In one or more embodiments, the StFS 102 may include one or more Application Programming Interfaces (APIs) 104 and be communicatively coupled to one or more orchestrators 140, in which the orchestrators 140 may include (but are not limited to) workflow orchestrator 141, container orchestrator 142, Software Defined Storage (SDS) orchestrator 143, and composition orchestrator 144. In one or more embodiments, these orchestrators are management & orchestration software systems, such as (by way of example and not limitation) Kubernetes, VMware's vROPS (vRealize Operations).

In one or more embodiments, one or more of the orchestrators 141-144 are instantiated as services that run within a container, as part of a virtual machine (VM), or as a stand-alone service or application running on a bare metal server platform. In one or more embodiments, the workflow orchestrator (e.g., vRealize Operations (vROPs), StackStorm, and Ansible Tower) is responsible for coordinating the discrete steps that are performed as a part of automating a given system configuration process. In one or more embodiments, the workflow orchestrator performs a configuration step, checks that the step completed successfully, and then performs the next configuration step (which may involve using information retrieved from the system after a prior configuration step or steps). A workflow orchestrator may also support a rewind function in case one or more of the steps fail.

In one or more embodiments, the container orchestrator (e.g., Kubernetes) is responsible for managing the lifecycle of any containers, which may include managing connections to persistent storage (e.g., Container Storage Interface (CSI)).

In one or more embodiments, the SDS orchestrator handles configuration of as well as overall monitoring of system resources used to create storage volumes from server resident storage capacity.

In one or more embodiments, the composition orchestrator uses the inventory of discrete system resources (e.g., CPU, memory, GPU, Smart NICs) to create composable hardware (HW) appliances. These composable HW appliances may be created from components that reside in either the same server chassis or from physically separate server chassis (e.g., CPU from system A, memory from system B, GPU from system C, etc.).

In one or more embodiments, the fabric service/director 120 may include one or more APIs 122 and may be communicatively coupled to the StFS 102, orchestrators 140, and the network fabric 110. In one or more embodiments, the fabric service/director 120 may be a controller that automatically configures a cluster of switches in the network fabric 110. In one or more embodiments, the fabric service/director 120 may perform various functions, such as discovery, transport, lifecycle, fabric and automation.

Figure 2:
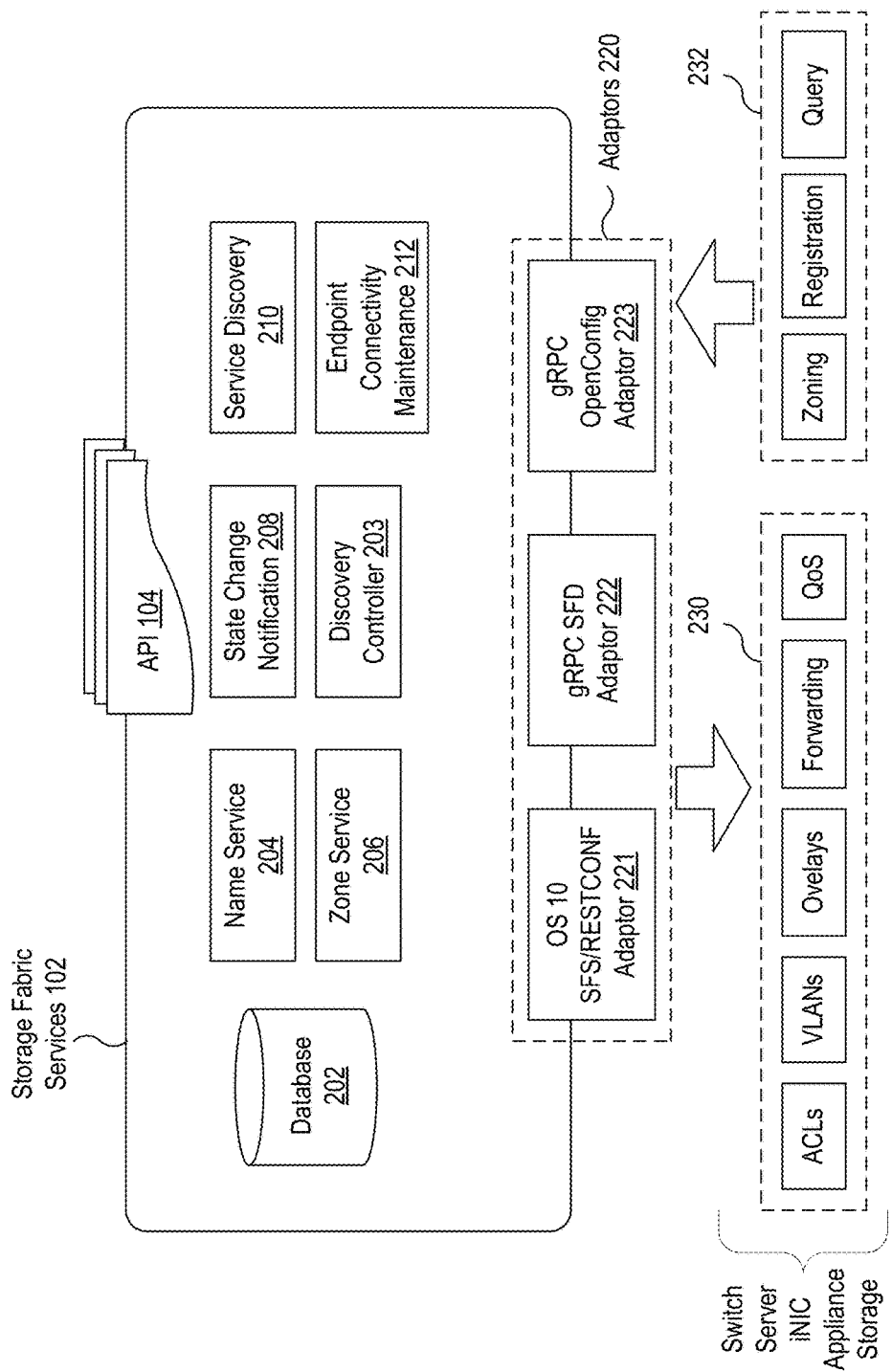
FIG. 2 depicts a Storage Fabric service (StFS), according to embodiments of the present disclosure.

FIG. 2 graphically depicts an StFS 102, according to embodiments of the present disclosure. As depicted, the StFS 102 may include: a database 202 (such as name database, name DB, in FIG. 1) for storing data, which may include storing and retrieving registration data; the APIs 104, including APIs for interfacing with one or more of the north-bound elements 140; and one or more adaptors 220 for communicating data with or to various network components, such as switch, server, Smart Network Interface Controller (Smart NIC), Network Interface Controller (NIC), appliance and storage. As shown in FIG. 1, in one or more embodiments, the StFS 102 may perform various functions: discovery of NVMe transport specific information, storing/retrieving registration information in/from the name database, and generating asynchronous events (e.g., Asynchronous Event Notifications (AEN)). In one or more embodiments, zoning may be supported in which the scope of discovery for a device may be limited, and zoning can act as a coarse grained (e.g., network interface level) access control mechanism and/or load balancing.

In one or more embodiments, the adaptors 220 communicate with network devices (e.g., switches and other fabrics devices). In one or more embodiments, the adaptors may include, but are not limited to, OS 10 SmartFabric Services (SFS)/REST adaptor 221, gRPC SmartFabric Director adaptor 222, and gRPC open configuration (OpenConfig) adaptor 223. In one or more embodiments, the adaptors 220 may send data 230, such as Access Control List (ACLs), virtual Local Area Networks (VLANs), Overlays, Forwarding, and Quality of Service (QoS). In one or more embodiments, the adaptors 220 may receive data 232, such as zoning information, registration (which discussed herein), and query data.

In one or more embodiments, the StFS 102 may perform various functions including but not limited to: name service 204 for storing and retrieving registration data in/from the database 202; zone service 206, which were as discussed above; asynchronous events (e.g., Asynchronous Event Notifications (AEN)) or State Change Notification (SCN)) 208 for notifying a change in status of an NVMe entity (i.e., an NVMe host or an NVM subsystem) or any of its elements (an element of an NVMe entity may refer to an entire device or component (e.g., such as an NVMe host or an NVM subsystem) or may refer to a subset or subcomponent (e.g., an interface, a port, an agent, or a controller of an NVMe host or an NVM subsystem); service discovery 210 for discovering an NVMe-oF communication endpoint for TCP/IP or UDP/IP (which may include: an Internet Protocol (IP) address, a Transmission Control Protocol (TCP) or User Datagram Protocol (UDP) port (and indication of which), or an NVMe-oF transport protocol (e.g., TCP, RoCEv2, or RDMA)); and endpoint connectivity maintenance 212 for maintaining connectivity to elements of an NVMe entity.

It shall be noted that the StFS may provide a number of beneficial services. First, in one or more embodiments, concerning an EBOF (Ethernet-attached Bunch of Flash products) configuration server, the StFS may provide a configuration repository for the EBOF products, which may be an NVMe drive enclosure containing multiple NVMe drives that can be connected to via Ethernet. In one or more embodiments, when an EBOF product comes online, it pulls its NVMe layer configuration (e.g., name space masking/mapping to hosts) from the configuration repository. This avoids the need for more complicated EBOF hardware, as well as decreases the need for users to interact with an embedded management application reside on the EBOF product.

Second, in one or more embodiments, concerning StFS Traffic Engineering Service, a StFS can consume telemetry information from NVMe hosts, NVM subsystems, and the fabric to detect hot spots (e.g., trouble areas, high traffic areas, down elements, etc.), drops and in the case of RoCE, congestion spreading, etc. It should be noted that references to RoCE herein are referring to RoCEv2 or other implementations or protocols with the same or similar functionality. A traffic Engineering Service may use this information to generate Explicit Congestion Notification packets to reduce the impact of these events in real time, as well as generate bandwidth/IO limits to prevent recurrence.

Third, in one or more embodiments, StFS can serve as a zoning attributes repository. Zoning functionality enables two or more NVMe entities to communicate with one another, and zoning attributes may be used to define how the devices communicate with each other. This information may be read by any of the elements participating (e.g., host, storage, switch in the fabric, etc.) to allow each to self-configure based on the attributes. For example:

a. Quality of Service (QoS)—QoS attributes specify performance aspects of communication among NVMe entities. In one or more embodiments, these attributes may include, but are not limited to, minimum and maximum values for bandwidth and latency. These values may be used by the Fabric to ensure that the flow uses the appropriate route, or by the storage to ensure that the appropriate class of storage media is used, or by the host to allow it to check whether the response time that it is experiencing is expected.

b. Transport depending on the requirements of the application, a specific transport (e.g., RoCE, TCP) may be desired. It should be noted that transport is an NVMe-oF communication endpoint characteristic, and typically all the endpoints in a zone use the same transport.

c. Isolation—it may be desirable in some cases to specify that a particular set of NVMe-oF end devices should be isolated to their own VLAN or Virtual Network Instance.

Fourth, in one or more embodiments, StFS can provide an embedded key management service for authentication and end-to-end encryption keys.

Figure 3:
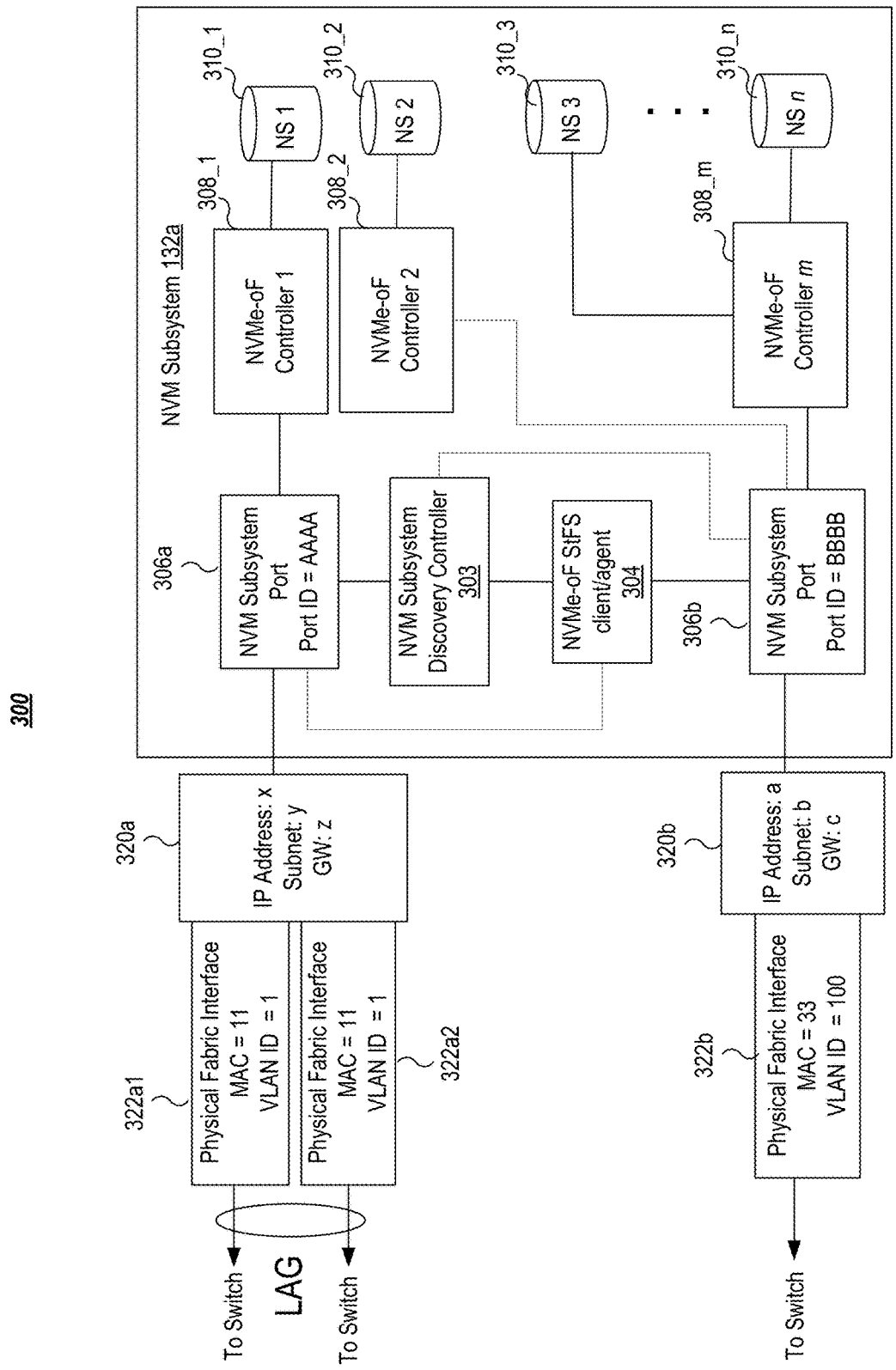
FIG. 3 depicts an NVM subsystem, according to embodiments of the present disclosure.

FIG. 3 depicts an NVM subsystem 132a, according to embodiments of the present disclosure. It shall be noted that the depicted NVM subsystem is an example provided to help facilitate the disclosure and that other NVM subsystem configurations may also be used. As depicted, the NVM subsystem 132a may include: one or more storage volumes 310_1-310_n; one or more NVMe-oF controllers 308_1-308_m that are communicatively coupled to and control data flow to/from the storage volumes 310_1-310_n; one or more NVM subsystem ports 306a and 306b through which the NVMe-oF controllers 308_1-308_m communicate data via the network fabric 110; an NVMe-oF discovery controller 303 communicatively coupled to the NVM subsystem port 306a and 306b; and NVMe-oF StFS client (which may also be referred to herein as an StFS agent) 304. While not illustrated in FIG. 3, it shall be noted that the NVM subsystem may comprise more connections between the NVMe-oF controllers 308_1-308_m and the storage volumes. For example, there may be m×n connectivity between the NVMe-oF controllers 308_1-308_m and the storage volumes 310_1-310_n. As illustrated in FIG. 3, the NVM subsystem ports (e.g., ports 306a and 306b) may be communicatively coupled to physical fabric interfaces (e.g., interfaces 322a1-322a2 and 322b), which are or provide communicative coupling to the network fabric 110.

In one or more embodiments, the NVM subsystem controllers 308_1-308_m provides access to the storage volumes 310_3-310_n, which may be realized as one or more NVMe namespaces. In one or more embodiments, namespaces are attached to controllers and/or controllers provide access to attached namespace. While not illustrated in FIG. 3, it shall be noted that the NVM subsystem 132a may comprise a set of NVMe-oF controllers 308_x per port. In one or more embodiments, each NVM subsystem port may have associated with it a port identifier (portID), an IP address, a subnet address, a gateway address, and a Media Access Control (MAC) address. Also, in one or more embodiments, a physical fabric interface may have a VLAN ID. In one or more embodiments, when dealing with trunked interface in which a physical port is on multiple VLANs, an implementation may comprise an StFS instance per relevant VLAN. In one or more embodiments, the NVMe hosts and NVM subsystems 130 may use Ethernet-based transports, such as, but not limited to, NVMe-oF/TCP 166 or NVMe-oF/RoCE 168. In one or more embodiments, to resolve problems associated with the conventional NVMe-over-Ethernet transports, each NVMe entity may include an StFS client/agent (such as agent/client 133 and 304) that communicates to the StFS 102 so as to perform registration of data associated with an NVMe host or NVM subsystem element or elements with the StFS 102. In one or more embodiments, the data associated with an element of an NVMe host or NVM subsystem may include one or more of the following: attribute(s), setting(s), characteristic(s), property/properties. For example, this data may include transport interface information that relates to access control of an element. As used herein, an element may refer to an entire device or component (e.g., such as an an NVMe host or an NVM subsystem) or may refer to a subset or subcomponent (e.g., an interface, a port, an agent, or a controller of an NVMe host or an NVM subsystem). In one or more embodiments, this data is provided by the StFS agent (133 and 304) to the StFS to be stored in the database 202.

In one or more embodiments, upon receipt of a query from an NVMe host or NVM subsystem (e.g., from an StFS agent of an NVMe host or NVM subsystem), the StFS 102 may provide the transport information stored in the database 202 for the NVMe host or the NVM subsystem so that the NVMe host or the NVM subsystem is able to discover IP addresses (e.g., 320b) and supported protocols of elements of other NVMe hosts or NVM subsystems that it can access. In one or more embodiments, the StFS 102 may operate as a centralized discovery service so that each NVMe host or NVM subsystem may discover a list of other elements of NVMe hosts or NVM subsystems for which connections can be established to enable data transfers via the network fabric 110.

In one or more embodiments, the StFS 102 may publish its existence to NVMe hosts and NVM subsystems (e.g., items 130) in a system, thereby enabling the NVMe hosts and NVM subsystems to register their transport information with the StFS 102. In one or more embodiments, the NVMe hosts and NVM subsystems may automatically discover the existence of the StFS 102 via service discovery records, such as Domain Name Service-Service Discovery (DNS-SD) records, which may in turn may be retrieved by suing a multicast Domain Name System (mDNS) protocol or another DNS protocol.

In one or more embodiments, when either NVMe-oF over TCP or NVMe-oF over another IP-based protocol (e.g., RoCE, iWARP, etc.) is used in the system 100, before a NVMe host can discover the storage resources (or, namespaces) that have been allocated to the host in the NVM subsystems, the host may first discover the accessible NVM subsystem transport interfaces (e.g., 322a1, 322a2, and 322b) behind which the namespaces have been provided. A conventional system typically uses a discovery controller and a discovery log page per NVM subsystem, but there is no specified initial discovery of the discovery controllers. In contrast, in one or more embodiments, the agent (e.g., agent 133) of the host may send a query to the transport information that is stored in the database 202 to the StFS 102, and, using the transport information received from the StFS 102, the host may be able to discover all of the NVM subsystems (or transport interfaces) that the host is allowed to access, reducing the usage of system resources to discover the accessible storages resources.

Figure 4:
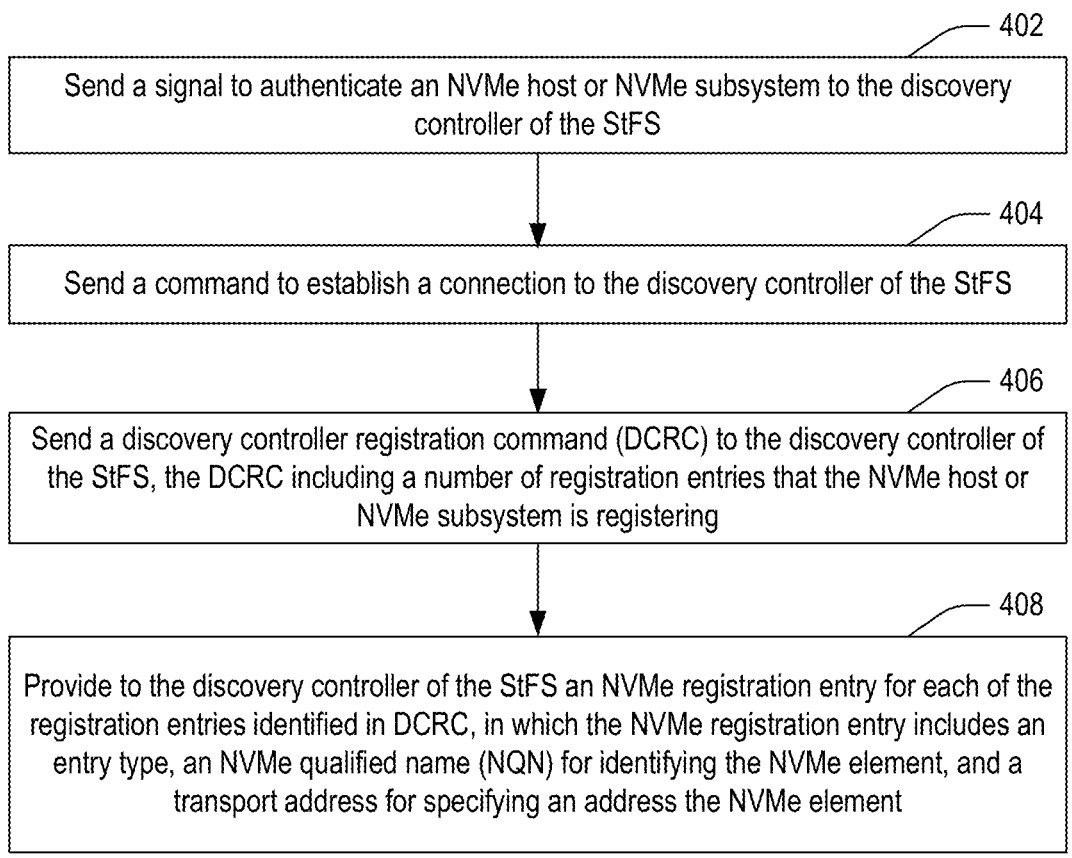
FIG. 4 depicts a flowchart of an exemplary method for registering an NVMe element of an NVMe host or NVM subsystem via a discovery controller of an StFS, according to embodiments of the present disclosure.

In one or more embodiments, before an NVMe host or NVM subsystem sends a query for transport information to the StFS 102, the NVMe host or NVM subsystem registers its transport information with the StFS 102. FIG. 4 depicts a flowchart 400 of an exemplary method for registering the transport information of one or more elements of an NVMe host or NVM subsystem with the StFS 102, according to embodiments of the present disclosure.

In one or more embodiments, an NVMe entity (e.g., an NVMe host or NVM subsystem) may send (402) an authorization signal to a centralized storage fabric service (e.g., the StFS) via the discovery controller 103. A signal may be used to authenticate the NVMe host or NVM subsystem to the centralized storage fabric service. Upon proper authentication, privileges may be authorized; for example, use access to a namespace is an example of a privilege. In one or more embodiments, authentication may be required after Connect before actual discovery can be performed. As depicted in the embodiment in FIG. 4, the NVMe host or NVM subsystem sends a command (e.g., a Fabrics Connect command) (404) to establish a communication connection to the StFS 102. In one or more embodiments, an StFS agent (e.g., 133 or 304) of the NVMe host or NVM subsystem may perform this function. In one or more embodiments, the command may include sending a fabric connect submission queue entry, which includes an indicator identifying whether the sender is a host or a subsystem. The indicator may be implemented as a CATTR (Connect Attributes) bit or bits, in which one indicator (e.g., 0b) indicates that the connection is being initiated by a NVMe host and another indicator (e.g., 1b) indicates that the connection is being initiated by an NVM subsystem. In one or more embodiments, if the indicator is that of an NVMe host, data may be communicated indicating additional information, such as a host identifier (host ID) and an NVMe Qualified Name (NQN), which is used to uniquely designate an NVMe host or NVM subsystem for various purposes such as identification and authentication; and if the indicator is that of an NVM subsystem, data may be communicated indicating additional information, such as a subsystem NQN (SUB NQN). In one or more embodiments, the system may include a command specific status code (e.g., E0h) that is defined to acknowledge successful processing of the indicator (e.g., the CATTR bit(s)).

Returning to FIG. 4, the StFS agent may send (406) a discovery controller registration command (DCRC) to the discovery controller 103 of the StFS, wherein the DCRC includes a number of registration entries that the NVMe host or NVMe subsystem is registering. In one or more embodiments, the discovery controller of the StFS is provided (408) with a number of NVMe registration entries corresponding to the number in the DCRC. In one or more embodiments, an NVMe registration entry includes an entry type, an NVMe qualified name (NQN) for identifying the NVMe element, and a transport address for specifying an address for the NVMe element Depending upon the underlying protocol, the discovery controller/StFS may request the specified number of NVMe registration entries or may receive them automatically.

FIG. 5 depicts an example discovery controller registration command (DCRC) 500, according to embodiments of the present disclosure. As depicted in FIG. 5, a discovery controller registration command may include a number of fields, including fields CDW10 505 and CDW11 510. In one or more embodiments, command 505 includes record format information, which specifies the format of the discovery controller registration command, and command 510, which specifies the number of discovery controller registration entries that are being provided by the NVMe host or NVM subsystem to be registered with the discovery controller/StFS. It shall be noted that other fields may be present (e.g., Opcode (identifies the command to be executed by the discovery controller), NameSpace Identifier (NSID) (identifies the namespace or storage volume involved), Command Identifier (CID) (specifying a unique identifier for the command), Data Pointer (DPTR) (contains a Scatter-Gather List (SGL) Entry (alternatively, an SGL list that comprises one SGL entry) that tells the Fabric/Transport how to transfer the data for the command, e.g., the registration entries), among other possible field). In one or more embodiments, the discovery controller registration command may be of the form of an Admin command, such as described in the NVM Express™ Base Specification Rev. 1.4 (which is incorporated herein by reference in its entirety), which is produced by the NVM Express organizationa non-profit consortium of technology industry leaders. It shall be noted that other types and formats of command may be employed.

As noted above, there is an identifier (e.g., indicator 510) that indicate the number of discovery controller registration entries that are being provided by the NVMe host or NVM subsystem. In one or more embodiments, the NVMe host or NVM subsystem has corresponding discovery controller registration data comprising an NVMe registration entry for the corresponding number of elements. In one or more embodiments, each NVMe registration entry may correspond to a single physical interface that has an IP address. By way of example and not limitation, assume NVM subsystem 132a has two elements it seeks to register (e.g., the two NVM subsystem ports 306a and 306b, which are respectively associated with IP addresses 320a and 320b). In this example, the identifier (e.g., indicator 510) will be set to the value "2."

In one or more embodiments, an NVM subsystem may include one or more NVMe-oF discovery controllers (e.g., discovery controller 303, as shown in FIG. 3). When a host queries the transport information of the NVM subsystem, the NVMe-oF discovery controller may provide the transport information of the NVM subsystem. However, in one or more embodiments, the NVM subsystem controllers (e.g., NVM subsystem controllers 308_1-308_m) may not register their transport information with the NVMe-oF discovery controller. Instead, as discussed above, the StFS agent (e.g., StFS agent 304) may register the transport information of the NVM subsystem controllers (e.g., NVM subsystem controllers 308_1-308_m) and/or the NVM subsystem discovery controller (e.g., NVM subsystem discovery controller 303) with the StFS.

Upon retrieving the discovery controller registration data 600 from the NVMe host or NVM subsystem, the StFS 102 stores the retrieved information (e.g., stores the information in database 202). Given the stored discovery controller registration data, the StFS 102 may function as a central discovery controller of a system (e.g., system 100).

Figure 6:
FIG. 6 depicts discovery controller registration data, according to embodiments of the present disclosure.

FIG. 6 depicts a discovery controller registration data format 600, according to embodiments of the present disclosure. As depicted, the discovery controller registration data format 600 includes one or more data blocks 602A-602n, where each data block includes data for an NVMe registration entry and the number n relates to the identifier (e.g., indicator 510) in the discovery controller registration command (DCRC). For example, if the number of entries identified in the discovery controller registration command is m then there will be 0 through n entries 602, in which n=m−1.

Figure 7:
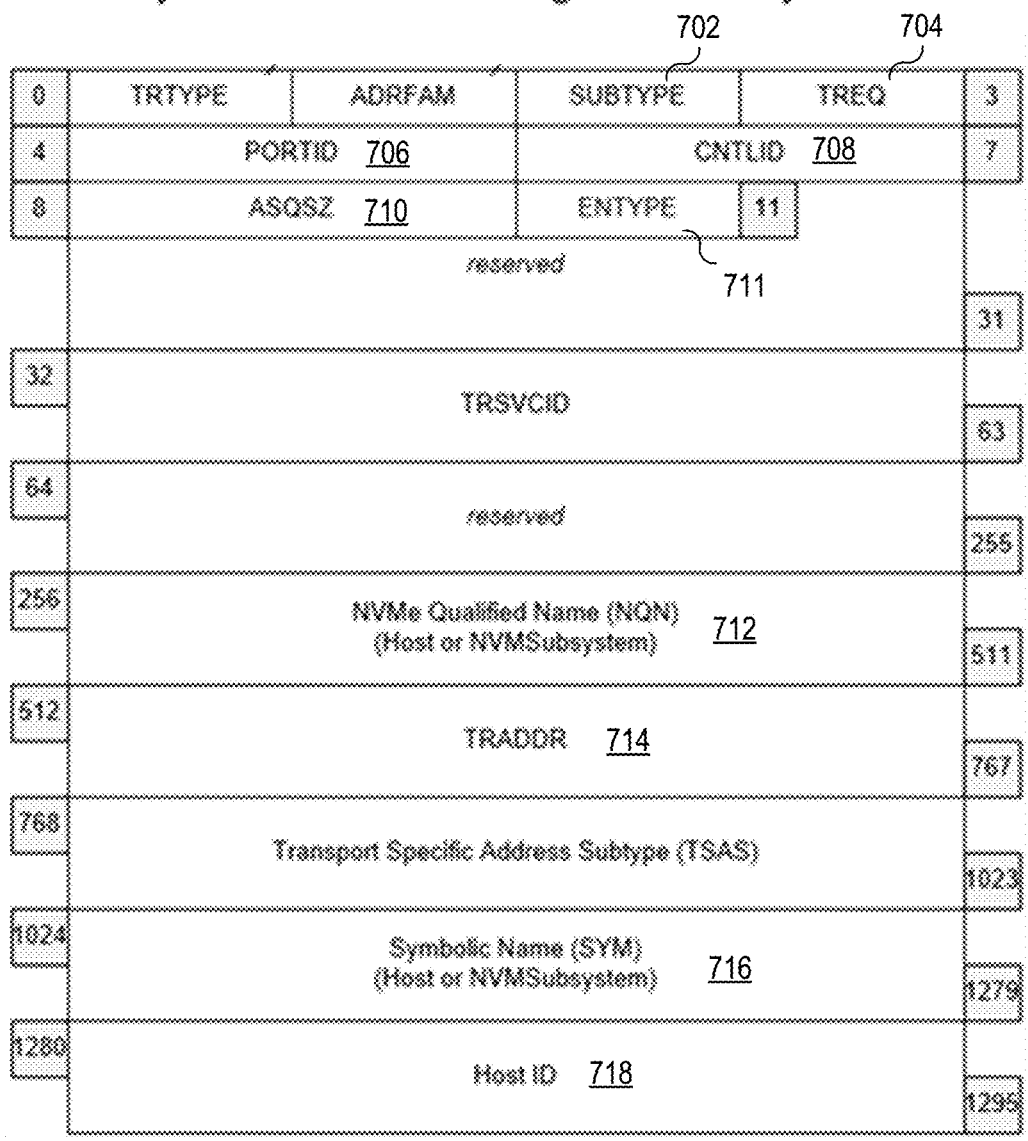
FIG. 7 depicts an NVMe-oF registration entry in FIG. 6 according to embodiments of the present disclosure.

FIG. 7 depicts an embodiment of an NVMe registration entry (e.g., 602x in FIG. 6), according to embodiments of the present disclosure, which may be registered with a discovery controller/StFS. It shall be noted that the NVMe registration entry embodiment in FIG. 7 is only one example and that different configurations/layout, different fields (or parameters), and different data field sizes may be used. It shall also be noted that the data format of the discovery controller registration data 600 may be used by a host or a subsystem. In one or more embodiments, the NVMe registration entry 700 include such parameters as:

(1) Transport Type (TRTYPE), which specifies the NVMe Transport type;

(2) Subsystem Type (SUBTYPE), which may include an indicator of the type of the NVM subsystem or whether it is an NVM subsystem at all;

(3) Transport Requirements (TREQ), which indicates requirements for the NVMe-oF transport and may distinguish transport requirements between an NVMe host and an NVM subsystem;

(4) Entity Type (ENTYPE), which may indicate the type of NVMe entity (e.g., if the value=00b, then the NVMe entity is not specified; if the value=01b, then the NVMe entity is an NVM subsystem; and if the value=10b, then the NVMe entity is an NVMe Host;

(5) NVM Subsystem Qualified Name (SUBNQN), which indicates: (a) for NVM subsystems, the NVMe Qualified Name (NQN) that uniquely identifies the NVM subsystem, and (b) for NVMe hosts, the NVMe Qualified Name (NQN) that uniquely identifies the host system;

(6) Transport Address (TRADDR), which indicates: (a) for NVM subsystems, the address of the NVM subsystem that may be used for a connect command, and (b) for NVMe hosts, the address of the host interface that will be used to connect to NVM subsystem admin and I/O queues;

(7) Symbolic Name (SYM), which specifies a Symbolic Name of the NVMe host or NVM subsystem (which may be specified as an ASCII string). In one or more embodiments, an Address Family field describes the reference for parsing this field; and (8) Host Identifier (HOSTID), which specifies: (a) for an NVM subsystems—this field may be reserved, and (b) for NVMe hosts, which field may have the same definition as the Host Identifier defined in the "Host Identifier" section of the NVMe Base specification, which is incorporated by reference herein.

Figure 8:
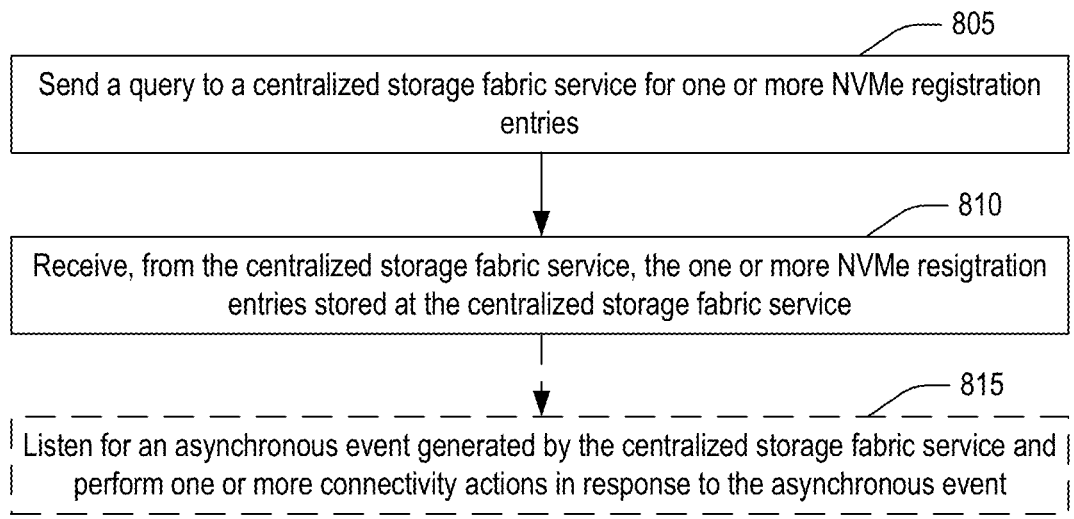
FIG. 8 depicts a method in which an NVMe host or an NVM subsystem may obtain information that has been registered with a centralized Storage Fabric service (StFS), according to embodiments of the present disclosure.

FIG. 8 depicts a method in which an NVMe host or an NVM subsystem may obtain information that has been registered with a centralized storage fabric service, according to embodiments of the present disclosure. In one or more embodiments, an NVMe host or NVM subsystem may send (805) a query to a centralized storage fabric service (e.g., StFS 102) to discover zero or more NVMe registration entries (such as, transport specific information) associated with an NVMe element. In one or more embodiment, the NVMe host or NVM subsystem may receive one or more NVMe registration entries from the centralized storage fabric service. For instance, the host 132b (or the StFS agent 133) may send the query 162 to the StFS 102 to discover NVMe registration entries (such as transport specific information) associated with the NVM subsystems that the host 132b has been granted access to. Upon receiving the query from the host 132b, the StFS 102 may retrieve and return (810) the NVMe registration entry stored in the database 202. In another example, the StFS agent 304 may send a query to the StFS 102 to discover a NVMe registration entry associated with the NVMe hosts that may potentially be allowed to access one or more namespaces associated with the NVM subsystem 300. Upon receiving the query, the StFS 102 retrieve and returns (810) the relevant NVMe registration entry or entries stored in its database.

In one or more embodiments, the StFS may perform other functions. For instance, an NVMe host or NVM subsubsystem may listen for an Asynchronous Event Notification (AEN) generated by the StFS and perform one or more connectivity actions, one or more discovery actions, or both in response to the asynchronous event.

Figure 9:
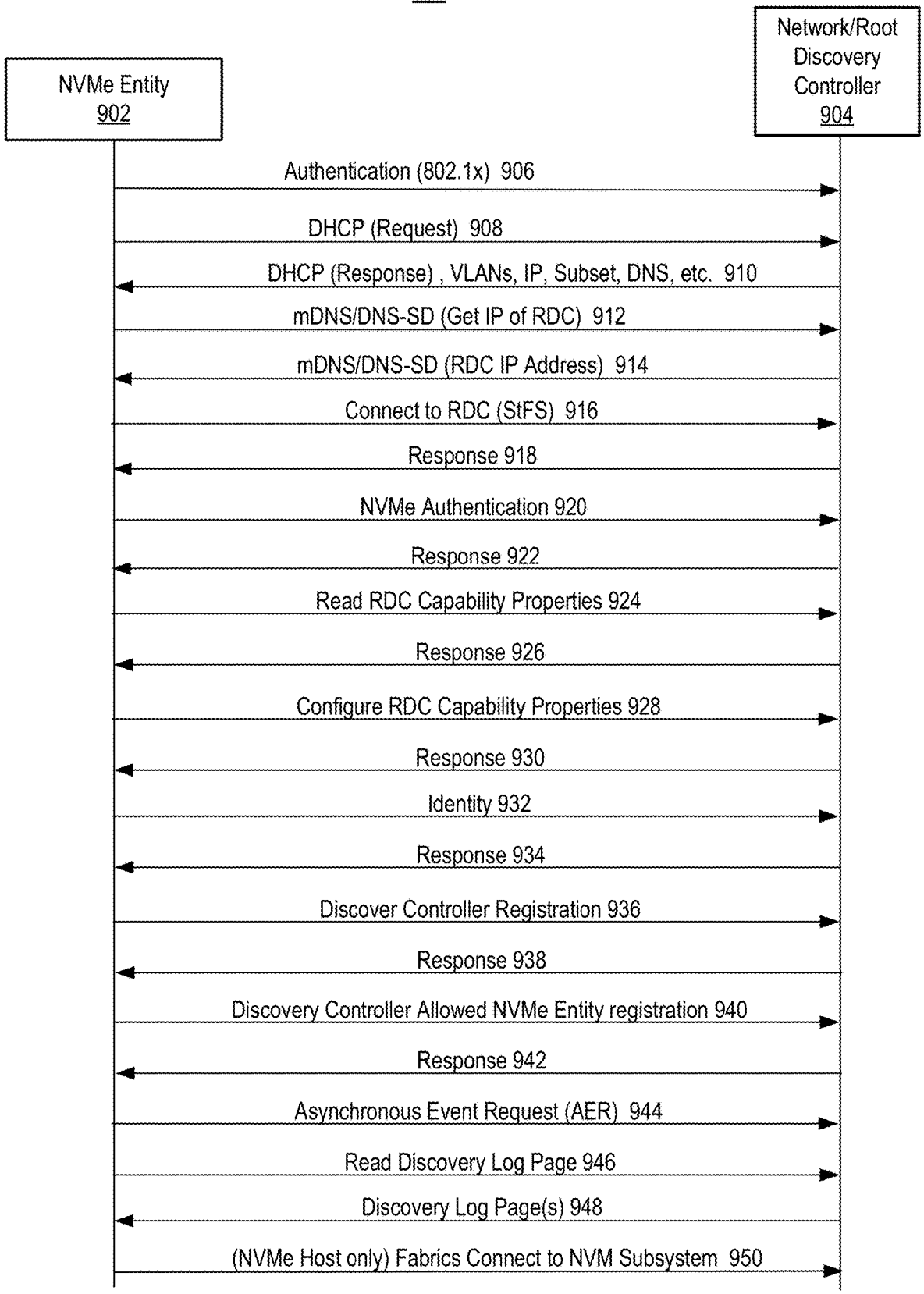
FIG. 9 depicts a flowchart of an exemplary method for communication between an NVMe entity and an StFS according to embodiments of the present disclosure.

FIG. 9 depicts a flowchart 900 of an exemplary method for interaction between an NVMe entity and an StFS according to embodiments of the present disclosure. The following sequence diagram illustrates various interactions, including how discovery controller registration may be used to interact with the StFS service. Recall that the terms "Root Discovery Controller," "RDC," and "StFS" may be treated as synonyms.

The first interaction, step 906, comprises IEEE 802.1x authentication by an NVMe Entity 902, which may be a NVMe Host or NVM subsystem, to a network/RDC 904. In one or more embodiments, this interaction may be optional.

The next interaction 908-910 depicts an interface configuration and VLAN discovery process. In one or more embodiments, this interaction may be optional.

A Root Discovery Controller is obtained via the discovery process depicted at steps 912-914. In one or more embodiments, this interaction may be optional.

Steps 916-918, represent the NVMe entity 902 connecting to the Root Discovery Controller. In one or more embodiments, Fabric Connect protocol may be used.

An NVMe-oF authentication interaction is depicted at steps 920-922. In one or more embodiments, this interaction may be optional.

A Root Discovery Controller configuration process is illustrated in steps 924-934.

The next interaction 936-938 depicts a Discovery Controller registration process. In one or more embodiments, this interaction may be optional for NVMe hosts. A Discovery Controller allowed NVMe entity registration process is depicted in steps 936-938. In one or more embodiments, this interaction may be optional for NVM subsystems. It shall be noted that a benefit of discovery controller registration processes is that one command format may be used by all end points.

Steps 940-948 depict an Asynchronous Event Request (AER) interaction.

Finally, step 950 depicts, for NVMe hosts, establishing end-to-end connectivity and performing NVMe discovery of namespaces.

In one or more embodiments, upon registering the transport information with the centralized storage fabric service, a host or subsystem (which should be understood to mean the host or subsystem or its StFS agent) may perform various functions. In one or more embodiments, an NVMe host or NVM subsystem may register or deregister transport information of one or more other elements, using either in-band or out-of-band create, read, update, and delete (CRUD) operations. In one or more embodiments, as discussed above, a host may send a query to the centralized storage fabric service to discover the transport specific information associated with an NVM subsystem or subsystems to which the host has been granted access. Also, in one or more embodiments, the StFS agent may modify the namespace access control mechanism of its NVM subsystem to allow one or more NVMe hosts to access the specific namespaces. In one or more embodiments, the StFS agent may publish a list of the NVMe hosts that have been granted access to a particular NVM subsystem interface (e.g., 322a) to the StFS. Also, in one or more embodiments, an NVMe host or NVM subsystem may modify the NVMe-oF connectivity information of one or more of its elements and may also establish connectivity to another element in the system using the best protocol supported by both elements. In one or more embodiments, an StFS agent may update its host NVMe multipathing information and register the updated information with the StFS. Also, in one or more embodiments, the StFS agent may listen for asynchronous events generated by the StFS and perform connectivity action(s) based on those events.

In one or more embodiments, an NVMe host or an NVM subsystem may deregister one or more elements with the centralized storage fabric service. In one or more embodiments, deregistration may be performed in a similar manner and using similar data formats as registration. For example, a discovery controller deregistration command may be an Admin command similar to that depicted in FIG. 5. Similarly, the deregistration entry may be similar to that depicted in FIG. 7. One skilled in the art shall recognize, however, that all the same fields used in registration may not be supplied for deregistration. For example, symbolic name may not be included in the discovery controller NVMe deregistration entry.

In one or more embodiments, aspects of the present patent document, such as NVMe hosts and/or NVM subsystem, may be directed to, may include, or may be implemented on or as one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, etc.) smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 10:
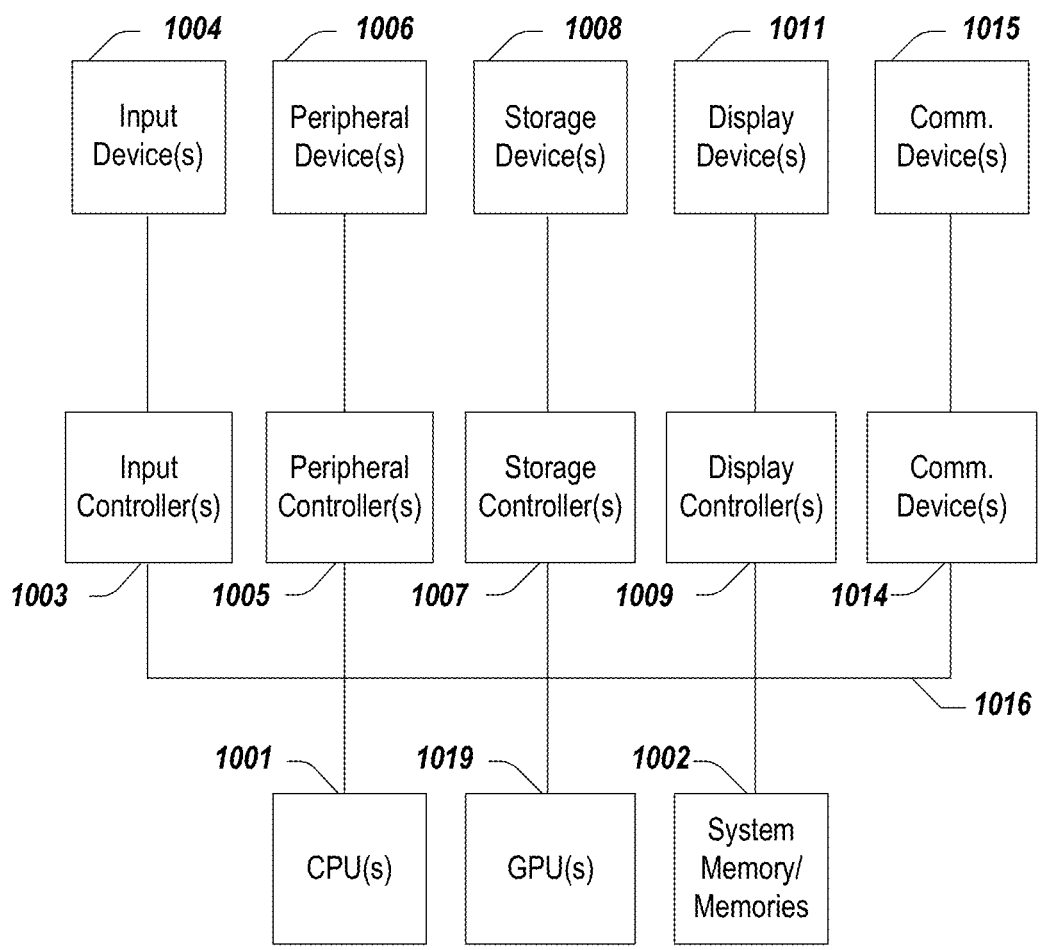
FIG. 10 depicts a simplified block diagram of an information handling system according to embodiments of the present invention.

FIG. 10 depicts a simplified block diagram of an information handling system (or computing system) according to embodiments of the present disclosure. It will be understood that the functionalities shown for system 1000 may operate to support various embodiments of a computing system—although it shall be understood that a computing system may be differently configured and include different components, including having fewer or more components as depicted in FIG. 10.

As illustrated in FIG. 10, the computing system 1000 includes one or more central processing units (CPU) 1001 that provides computing resources and controls the computer. CPU 1001 may be implemented with a microprocessor or the like, and may also include one or more graphics processing units (GPU) 1019 and/or a floating-point coprocessor for mathematical computations. System 1000 may also include a system memory 1002, which may be in the form of random-access memory (RAM), read-only memory (ROM), or both.

A number of controllers and peripheral devices may also be provided, as shown in FIG. 10. An input controller 1003 represents an interface to various input device(s) 1004, such as a keyboard, mouse, touchscreen, and/or stylus. The computing system 1000 may also include a storage controller 1007 for interfacing with one or more storage devices 1008 each of which includes a storage medium such as magnetic tape or disk, or an optical medium that might be used to record programs of instructions for operating systems, utilities, and applications, which may include embodiments of programs that implement various aspects of the present disclosure. Storage device(s) 1008 may also be used to store processed data or data to be processed in accordance with the disclosure. The system 1000 may also include a display controller 1009 for providing an interface to a display device 1011, which may be a cathode ray tube (CRT), a thin film transistor (TFT) display, organic light-emitting diode, electroluminescent panel, plasma panel, or other type of display. The computing system 1000 may also include one or more peripheral controllers or interfaces 1005 for one or more peripherals 1006. Examples of peripherals may include one or more printers, scanners, input devices, output devices, sensors, and the like. A communications controller 1014 may interface with one or more communication devices 1015, which enables the system 1000 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 1016, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Figure 11:
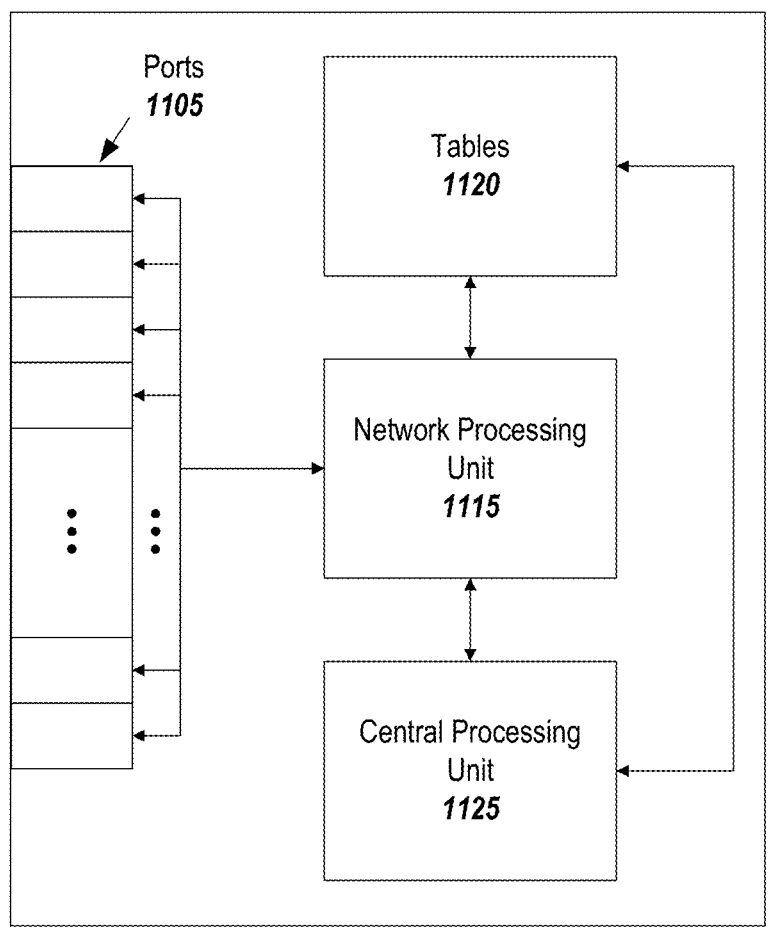
FIG. 11 depicts an alternative block diagram of an information handling system, according to embodiments of the present disclosure.

FIG. 11 depicts an alternative block diagram of an information handling system, according to embodiments of the present disclosure. It will be understood that the functionalities shown for system 1100 may operate to support various embodiments of the present disclosure although it shall be understood that such system may be differently configured and include different components (including fewer or more components).

The information handling system 1100 may include a plurality of I/O ports 1105, a network processing unit (NPU) 1115, one or more tables 1120, and a central processing unit (CPU) 1125. The system includes a power supply (not shown) and may also include other components, which are not shown for sake of simplicity.

In one or more embodiments, the I/O ports 1105 may be connected via one or more cables to one or more other network devices or clients. The network processing unit 1115 may use information included in the network data received at the node 1100, as well as information stored in the tables 1120, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts.

Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for registering one or more elements of a non-volatile memory express (NVMe) entity in a NVMe over Fabric (NVMe-oF) system, comprising:
    establishing a connection to a discovery controller of the NVMe-oF system;
    transmitting a discovery controller registration command (DCRC) to the discovery controller, the discovery controller registration command (DCRC) comprising an identifier indicating a number of registrations to be registered with the discovery controller; and
    transmitting to the discovery controller an NVMe registration for each element corresponding to the number of registrations indicated in the discovery controller registration command (DCRC), in which an NVMe registration comprises:
        an indicator for indicating a type of the NVMe registration;
        an NVMe qualified name (NQN) for identifying the element of the NVMe entity; and
        a transport address for specifying an address for the element of the NVMe entity.

2. The computer-implemented method of claim 1, wherein a plurality of data is registered regarding the element of the NVMe entity.

3. The computer-implemented method of claim 2, wherein the plurality of data comprises one or more attributes, parameters, properties, or components associated with the element of the NVMe entity.

4. The computer-implemented method of claim 1, further comprising:
    authenticating the NVMe entity to the discovery controller before transmitting the discovery controller registration command (DCRC) to the discovery controller.

5. The computer-implemented method of claim 1 wherein the discovery controller comprises or has access to a datastore of NVMe registrations from a plurality of NVMe entities comprising one or more NVMe hosts and one or more non-volatile memory (NVM) subsystems and the method further comprises:
    sending to the discovery controller a query to identify a listing of elements that are relevant to the NVMe entity that is sending the query, in which the listing of elements is obtained from the datastore of NVMe registrations; and
    receiving, from the discovery controller, a listing of elements from the datastore of NVMe registrations that are relevant to the NVMe entity that sent the query.

6. The computer-implemented method of claim 1, further comprising:
    listening for an asynchronous event message generated by the discovery controller; and
    performing one or more connectivity actions, one or more discovery actions, or both in response to information received in the asynchronous event message.

7. The computer-implemented method of claim 1, wherein the NVMe registration further comprises a symbolic name for the element of the NVMe entity.

8. The computer-implemented method of claim 1, wherein the NVMe entity is an NVMe host and the NVMe registration further comprises a host identifier for the NVMe host.

9. A non-transitory computer-readable medium or media comprising one or more sequences of instructions which, when executed by one or more processors, causes steps to be performed for registering one or more elements of a non-volatile memory express (NVMe) entity in a NVMe over Fabric (NVMe-oF) system, comprising:
    establishing a connection to a discovery controller of the NVMe-oF system;
    transmitting a discovery controller registration command (DCRC) to the discovery controller, the discovery controller registration command (DCRC) comprising an identifier indicating a number of registrations to be registered with the discovery controller; and
    transmitting to the discovery controller an NVMe registration for each element corresponding to the number of registrations indicated in the discovery controller registration command (DCRC), in which an NVMe registration comprises:
        an indicator for indicating a type of the NVMe registration;
        an NVMe qualified name (NQN) for identifying the element of the NVMe entity; and
        a transport address for specifying an address for the element of the NVMe entity.

10. The non-transitory computer-readable medium or media of claim 9, wherein a plurality of data is registered regarding the element of the NVMe entity and the plurality of data comprises one or more attributes, parameters, properties, or components associated with the element of the NVMe entity.

11. The non-transitory computer-readable medium or media of claim 9, wherein the discovery controller comprises a datastore of NVMe registrations from a plurality of NVMe entities comprising one or more NVMe hosts and one or more non-volatile memory (NVM) subsystems and the non-transitory computer-readable medium or media further comprises one or more sequences of instructions which, when executed by one or more processors, causes steps to be performed comprising:

sending to the discovery controller a query to identify a listing of elements that are relevant to the NVMe entity that is sending the query, in which the listing of elements is obtained from the datastore of NVMe registrations; and receiving, from the discovery controller, a listing of elements from the datastore of NVMe registrations that are relevant to the NVMe entity that sent the query.

12. The non-transitory computer-readable medium or media of claim 9, further comprising one or more sequences of instructions which, when executed by one or more processors, causes steps to be performed comprising:

listening for an asynchronous event message generated by the discovery controller; and performing one or more connectivity actions, one or more discovery actions, or both in response to information received in the asynchronous event message.

13. The non-transitory computer-readable medium or media of claim 9, wherein the NVMe registration further comprises a symbolic name for the NVMe entity.

14. The non-transitory computer-readable medium or media of claim 9, wherein the NVMe entity is an NVMe host and the NVMe registration further comprises a host identifier for the NVMe host.

15. A system for registering one or more elements of a non-volatile memory express (NVMe) entity in a NVMe over Fabric (NVMe-oF) system, comprising one or more processors; and a non-transitory computer-readable medium or media comprising one or more sets of instructions which, when executed by at least one of the one or more processors, causes steps to be performed comprising:

establishing a connection to a discovery controller of the NVMe-oF system;

transmitting a discovery controller registration command (DCRC) to the discovery controller, the discovery controller registration command (DCRC) comprising an identifier indicating a number of registrations to be registered with the discovery controller; and transmitting to the discovery controller an NVMe registration for each element corresponding to the number of registrations indicated in the discovery controller registration command (DCRC), in which an NVMe registration comprises:

an indicator for indicating a type of the NVMe registration;

an NVMe qualified name (NQN) for identifying the element of the NVMe entity; and a transport address for specifying an address for the element of the NVMe entity.

16. The system of claim 15, wherein a plurality of data is registered regarding the element of the NVMe entity and the plurality of data comprises one or more attributes, parameters, properties, or components associated with the element of the NVMe entity.

17. The system of claim 15, wherein the discovery controller comprises a datastore of NVMe registrations from a plurality of NVMe entities comprising one or more NVMe hosts and one or more non-volatile memory (NVM) subsystems and the non-transitory computer-readable medium or media further comprises one or more sequences of instructions which, when executed by one or more processors, causes steps to be performed comprising:

sending to the discovery controller a query to identify a listing of elements that are relevant to the NVMe entity that is sending the query, in which the listing of elements is obtained from the datastore of NVMe registrations; and receiving, from the discovery controller, a listing of elements from the datastore of NVMe registrations that are relevant to the NVMe entity that sent the query.

18. The system of claim 15, further comprising one or more sequences of instructions which, when executed by one or more processors, causes steps to be performed comprising:

listening for an asynchronous event message generated by the discovery controller; and performing one or more connectivity actions, one or more discovery actions, or both in response to information received in the asynchronous event message.

19. The system of claim 15, wherein the NVMe registration further comprises a symbolic name for the NVMe entity.

20. The system of claim 15, wherein the NVMe entity is an NVMe host and the NVMe registration further comprises a host identifier for the NVMe host.

* * * * *